US 12,045,060 B2

(12) United States Patent
Tadano

(10) Patent No.: US 12,045,060 B2
(45) Date of Patent: Jul. 23, 2024

(54) CONVEYANCE ROUTE DESIGN DEVICE, CONVEYANCE ROUTE DESIGN METHOD, AND A RECORDING MEDIUM

(71) Applicant: NEC Corporation, Tokyo (JP)

(72) Inventor: Kumiko Tadano, Tokyo (JP)

(73) Assignee: NEC CORPORATION, Tokyo (JP)

(*) Notice: Subject to any disclaimer, the term of this patent is extended or adjusted under 35 U.S.C. 154(b) by 412 days.

(21) Appl. No.: 17/433,695

(22) PCT Filed: Feb. 28, 2019

(86) PCT No.: PCT/JP2019/007846
§ 371 (c)(1),
(2) Date: Aug. 25, 2021

(87) PCT Pub. No.: WO2020/174663
PCT Pub. Date: Sep. 3, 2020

(65) Prior Publication Data
US 2022/0155789 A1 May 19, 2022

(51) Int. Cl.
B65G 1/00 (2006.01)
G01C 21/34 (2006.01)
G05B 19/418 (2006.01)
G05D 1/00 (2006.01)

(52) U.S. Cl.
CPC ....... G05D 1/0217 (2013.01); G01C 21/3461 (2013.01)

(58) Field of Classification Search
CPC .................. G01C 21/3461; G05D 2201/0216
See application file for complete search history.

(56) References Cited

U.S. PATENT DOCUMENTS

| 2011/0295411 A1 | 12/2011 | Rotella et al. |
| 2012/0065762 A1* | 3/2012 | Pillarisetti ............ G06Q 99/00 705/500 |
| 2020/0160240 A1 | 5/2020 | Tadano et al. |

FOREIGN PATENT DOCUMENTS

| DE | 102010044239 A1 | 10/2011 | |
| JP | 2000-039905 A | 2/2000 | |
| JP | 2003162313 A * | 11/2001 | ........... G05B 19/418 |
| JP | 2003162313 A * | 11/2001 | ........... G05B 19/418 |
| JP | 2003-162313 A | 6/2003 | |
| JP | 2013-127734 A | 6/2013 | |
| JP | 2015-205777 A | 11/2015 | |

(Continued)

OTHER PUBLICATIONS

JP 2003162313 A—Machine Translation—Nagao et al. (Year: 2001).*

(Continued)

Primary Examiner — Jess Whittington
Assistant Examiner — Rami Nabih Bedewi

(57) ABSTRACT

A conveyance route design device is capable of reducing costs while maintaining object conveyance efficiency. The determination unit determines an improvement target place that satisfies criteria for changing a current conveyance device to a conveyance device of lower conveyance capacity than the current conveyance device, for a plurality of conveyance routes. The assignment unit assigns the conveyance device of lower conveyance capacity to an improvement candidate route which is a conveyance route including the improvement target place.

12 Claims, 12 Drawing Sheets

(56) References Cited

FOREIGN PATENT DOCUMENTS

WO         2014/012861 A1     1/2014
WO         2018/193585 A1     10/2018

OTHER PUBLICATIONS

Machine Translation—JP2003162313A (Year: 2001).*
JP Office Action for JP Application No. 2021-501499, mailed on Jul. 26, 2022 with English Translation.
International Search Report for PCT Application No. PCT/JP2019/007846, mailed on Jun. 4, 2019.

* cited by examiner

LAYOUT INFORMATION

| OBSTACLE ID | VERTEX COORDINATES OF OBSTACLE SHAPE |
|---|---|
| O1 | {(1,1), (2,1), (2,2), (1,2) } |
| O2 | {(4,4), (12,4), (12,12), (4,12)} |
| O3 | {(15,15), (18,15), (18,18), (15,18) } |
| O4 | {(26,0), (30,0), (30,4), (28,6), (26, 4)} |
| O5 | {(20,0), (24,0), (24,4), (20,4) } |
| O6 | {(20,20), (24,20), (24,24), (20,24) } |
| O7 | {(0,16), (1,16), (1,18), (0,18) } |
| O8 | {(8,23), (10,23), (10,24), (8,24) } |
| O9 | {(11,23), (13,23), (13,24), (11,24) } |
| O10 | {(14,23), (16,23), (16,24), (14,24) } |

CONVEYANCE ROUTE INFORMATION

| CONVEYANCE ROUTE ID | CONVEYANCE SOURCE | CONVEYANCE DESTINATION | PASSING POINT | SHAPE |
|---|---|---|---|---|
| R1 | (5,3) | (5,1) | none | STRAIGHT LINE |
| R2 | (8,3) | (8,1) | none | STRAIGHT LINE |
| R3 | (11,3) | (11,1) | none | STRAIGHT LINE |
| R4 | (17,1) | (19,23) | (17,12),(19,12) | TURNING LINE |
| R5 | (21,5) | (21,19) | none | STRAIGHT LINE |
| R6 | (23,5) | (23,19) | none | STRAIGHT LINE |
| R7 | (1,17) | (15,23) | none | CURVE |
| R8 | (1,17) | (12,23) | none | CURVE |
| R9 | (1,17) | (9,23) | none | CURVE |
| R10 | (14,1) | (31,8) | (14,8) | TURNING LINE |
| R11 | (1,11) | (3,11) | none | STRAIGHT LINE |
| R12 | (1,8) | (3,8) | none | STRAIGHT LINE |
| R13 | (1,5) | (3,8) | none | STRAIGHT LINE |

FIG. 8A

CONVEYANCE REQUEST HISTORY INFORMATION

| CONVEYANCE REQUEST ID | CONVEYANCE SOURCE | CONVEYANCE DESTINATION | REQUEST OCCURENCE TIME | OBJECT ID | DEADLINE | CONVEYANCE DEVICE ID |
|---|---|---|---|---|---|---|
| Req1 | (17,1) | (19,23) | 10:32:54 | P1 | 10:45 | E1 |
| Req2 | (21,5) | (21,19) | 10:33:05 | P2 | 10:45 | E2 |
| Req3 | (1,17) | (12,23) | 10:33:21 | P3 | 10:50 | E3 |
| ⋮ | ⋮ | ⋮ | ⋮ | ⋮ | ⋮ | ⋮ |

FIG. 8B

MOVEMENT HISTORY INFORMATION

| MOVEMENT HISTORY ID | CURRENT COORDINATES | CONVEYANCE ROUTE ID DURING STAY | TIME | CONVEYANCE REQUEST ID | CONVEYANCE DEVICE ID |
|---|---|---|---|---|---|
| M1 | (17,1) | R4 | 10:34:54 | Req1 | E1 |
| M2 | (21,6) | R5 | 10:35:05 | Req2 | E2 |
| M3 | (29,8) | R10 | 10:35:20 | Req3 | E1 |
| ⋮ | ⋮ | ⋮ | ⋮ | ⋮ | ⋮ |

FIG. 8C

IMPROVEMENT CANDIDATE ROUTE INFORMATION

| IMPROVEMENT CANDIDATE ROUTE ID | START POINT | END POINT | CONVEYANCE ROUTE | IMPROVEMENT NECESSITY DEGREE |
|---|---|---|---|---|
| C2 | (21,5) | (21,19) | R5 | 50 |
| C3 | (14,7) | (30,8) | R10 | 100 |
| C4 | (5,3) | (5,1) | R1 | 75 |

FIG. 11

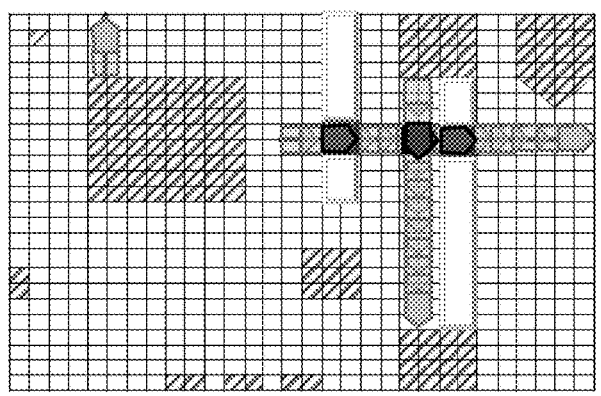

OBSTACLE

UNIDIRECTIONAL CONVEYOR NOT IN IMPROVEMENT CANDIDATE ROUTE

OMNIDIRECTIONAL CONVEYOR

AREA OCCUPIED BY CONVEYANCE VEHICLE ON IMPROVEMENT CANDIDATE ROUTE

AREA WHERE CONVEYANCE VEHICLE OVERLAP NON-IMPROVEMENT CANDIDATE ROUTE

FIG. 12

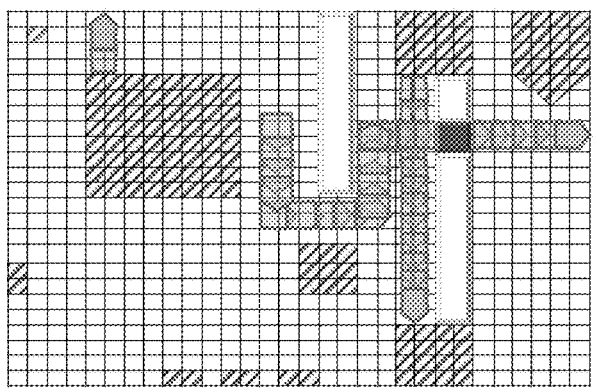

OBSTACLE

······▶ CONVEYANCE ROUTE

───▶ IMPROVEMENT CANDIDATE ROUTE

AREA OCCUPIED BY CONVEYANCE VEHICLE ON IMPROVEMENT CANDIDATE ROUTE

FIG. 13

DEVICE ASSIGNMENT INFORMATION

| ASSIGNMENT ID | IMPROVEMENT CANDIDATE ROUTE ID | START POINT | END POINT | TYPE OF CONVEYOR |
|---|---|---|---|---|
| A4 | C2 | (21,5) | (21,19) | CONVEYANCE VEHICLE |
| A7 | C3 | (14,7) | (14,13) | CONVEYANCE VEHICLE |
| A8 | C3 | (14,13) | (20,13) | CONVEYANCE VEHICLE |
| A9 | C3 | (20,13) | (20,8) | CONVEYANCE VEHICLE |
| A10 | C3 | (20,8) | (24,8) | CONVEYANCE VEHICLE |
| A11 | C3 | (24,8) | (26,8) | OMNIDIRECTIONAL CONVEYOR |
| A12 | C3 | (26,8) | (30,8) | CONVEYANCE VEHICLE |
| A13 | C4 | (5,3) | (5,1) | CONVEYANCE VEHICLE |

FIG. 14

IMPROVEMENT PLAN INFORMATION

| IMPROVEMENT PLAN ID | C2 | C3 | C4 |
|---|---|---|---|
| I1 (PRESENT) | NOT IMPROVED | NOT IMPROVED | NOT IMPROVED |
| I3 | IMPROVED | NOT IMPROVED | NOT IMPROVED |
| I4 | NOT IMPROVED | IMPROVED | NOT IMPROVED |
| I5 | NOT IMPROVED | NOT IMPROVED | IMPROVED |
| I6 | IMPROVED | IMPROVED | NOT IMPROVED |
| I9 | NOT IMPROVED | IMPROVED | IMPROVED |
| I10 | IMPROVED | NOT IMPROVED | IMPROVED |
| I15 | IMPROVED | IMPROVED | IMPROVED |

FIG. 15

CONVEYANCE DEVICE INFORMATION

| CONVEYANCE DEVICE ID | DESCRIPTION | AVERAGE CONVEYANCE EFFICIENCY [/s] | REPLACEMENT COST |
|---|---|---|---|
| E1 | OMNIDIRECTIONAL CONVEYOR | 10 | 1000[/m] |
| E2 | UNIDIRECTIONAL CONVEYOR | 10 | 200[/m] |
| E3 | CONVEYANCE VEHICLE | 1 | 400 [/PIECE] |

FIG. 16

EVALUATION RESULT INFORMATION

| IMPROVEMENT PLAN ID | REQUIRED COST | EVALUATION INDEX | |
|---|---|---|---|
| I1 | 4800+8000-1000*2+800=11600 | 600 | |
| I3 | 1200+8000+800=10000 | 600 | P3 |
| I4 | 4800+1600+800=7200 | 550 | |
| I5 | 4800+8000-1000*2+400=11200 | 580 | |
| I6 | 1200+1600+800=3600 | 430 | P2 |
| I9 | 4800+1600+400=6800 | 410 | |
| I10 | 1200+8000+400=9600 | 420 | |
| I15 | 1200+1600+400=3200 | 300 | P1 |

ALLOWABLE CONVEYANCE EFFICIENCY INFORMATION

| IMPROVEMENT DESIGN PLAN | ALLOWABLE CONVEYANCE EFFICIENCY |
|---|---|
| P1 | 200 |
| P2 | 400 |
| P3 | 600 |

CONVEYANCE ROUTE DESIGN DEVICE, CONVEYANCE ROUTE DESIGN METHOD, AND A RECORDING MEDIUM

This application is a National Stage Entry of PCT/JP2019/007846 filed on Feb. 28, 2019, the contents of all of which are incorporated herein by reference, in their entirety.

TECHNICAL FIELD

The present invention relates to a device or the like for reducing costs of conveyance routes.

BACKGROUND ART

In factories and warehouses, conveyance devices such as conveyance vehicles, unidirectional conveyors and omnidirectional conveyors are used for conveyance of objects. A number of unidirectional conveyors are used in factories and warehouses for high-speed conveyance in specific directions. On the other hand, the use of omnidirectional conveyors (e.g., cellveyor) which can convey objects at high speed in any direction on the conveyance surface is becoming widespread in recent years. Patent Document 1 discloses an omnidirectional conveyor of the modular type.

In factories and warehouses, in order to reduce the cost of conveying objects (electronic parts, chemicals, work-in-process products, etc.), design changes such as changes of conveyance routes and changes of the conveyance devices to be used are often made based on the movement history of objects. In reducing the conveyance cost, it is important to maintain the conveyance efficiency so as to suppress the deterioration of the conveyance efficiency to the range without trouble. Such design changes have been made by skilled designers of the layout of factories and warehouses, but due to the recent severity of manpower shortages, it has become difficult to secure skilled designers. Patent Document 2 discloses a method of determining the optimum conveyance route based on the conveyance cost and the movement cost of the objects.

PRECEDING TECHNICAL REFERENCES

Patent Documents

Patent Document 1: International Publication No. WO2014/012861
Patent Document 2: International Publication No. WO2018/193585

SUMMARY OF INVENTION

Problem to be Solved by the Invention

The above patent documents do not describe a method for reducing costs while maintaining conveyance efficiency by effectively combining various conveyance devices such as conveyance vehicles, unidirectional conveyors and omnidirectional conveyors.

It is an example object of the present invention to provide a conveyance route design device capable of reducing costs while maintaining conveyance efficiency in a conveyance system.

Means for Solving the Problem

In order to solve the above example object, according to an example aspect of the present invention, there is provided a conveyance route design device comprising:

a determination unit configured to determine an improvement target place that satisfies criteria for changing a current conveyance device to a conveyance device of lower conveyance capacity than the current conveyance vehicle, for a plurality of conveyance routes; and
an assignment unit configured to assign the conveyance device of lower conveyance capacity to an improvement candidate route which is the conveyance route including the improvement target place.

According to another example aspect of the present invention, there is provided a conveyance route design method executed by a computer, the method comprising:

determining an improvement target place that satisfies criteria for changing a current conveyance device to a conveyance device of lower conveyance capacity than the current conveyance device, for a plurality of conveyance routes; and
assigning the conveyance device of lower conveyance capacity to an improvement candidate route which is a conveyance route including the improvement target place.

According to still another example aspect of the present invention, there is provided a recording medium recording a conveyance route design program that causes a computer to function as:

a determination function of determining an improvement target place that satisfies criteria for changing a current conveyance device to a conveyance device of lower conveyance capacity than the current conveyance device, for a plurality of conveyance routes; and
an assignment function of assigning the conveyance device of lower conveyance capacity to an improvement candidate route which is a conveyance route including the improvement target place.

Effect of the Invention

According to the present invention, it is possible to reduce cost while maintaining conveyance efficiency in a conveyance system.

BRIEF DESCRIPTION OF THE DRAWINGS

FIGS. 8A to 8C illustrate examples of conveyance request history information, movement history information and improvement candidate route information.

FIG. 11 is a plan view illustrating intersection areas.

FIG. 12 is a plan view illustrating an assignment example of the conveyance device to the improvement candidate route.

FIG. 13 illustrates device assignment information in case of FIG. 12.

FIG. 14 illustrates an example of improvement plan information.

FIG. 15 illustrates an example of conveyance device information.

FIG. 16 illustrates an example of evaluation result information.

EXAMPLE EMBODIMENTS

Preferred example embodiments of the present invention will now be described below with reference to the attached drawings.

[Device Configuration]

Figure 1:
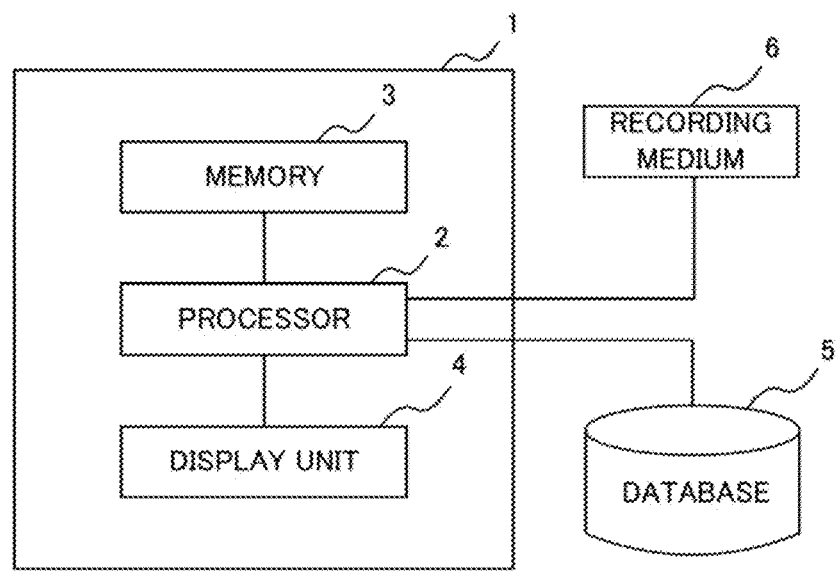
FIG. 1 is a block diagram illustrating a hardware configuration of a conveyance route design device according to example embodiments.

FIG. 1 is a block diagram illustrating a hardware configuration of a conveyance route design device according to the example embodiments. The conveyance route design device 1 is constituted by a computer, and includes a processor 2, a memory 3 and a display unit 4. The conveyance route design device 1 is connected to a database 5 and a recording medium 6. As will be described later, the database 5 stores various kinds of information necessary for designing the conveyance routes. The recording medium 6 stores a program for designing the conveyance routes. The recording medium 6 is, for example, a non-transitory recording medium such as a non-volatile recording medium. When the conveyance route design device 1 executes processing, the program recorded on the recording medium 6 is loaded into the memory 3. Also, the memory 3 functions as a work memory during execution of the conveyance route improvement processing by the conveyance route design device 1, and stores various kinds of information generated during the processing. The display unit 4 displays improvement plans of the conveyance routes obtained by the conveyance route improvement processing to be presented to the user.

[Conveyance Device]

The conveyance route design device 1 is installed in a factory or a warehouse, and designs the conveyance routes capable of reducing costs while maintaining conveyance efficiency for a conveyance system utilizing a plurality of various conveyance devices. Here, the conveyance device may be a conveyance vehicle, a unidirectional conveyor and an omnidirectional conveyor. The conveyance efficiency is indicated by, for example, a number of objects conveyed per unit time, a ratio of a number of shipped objects to a number of incoming objects, a ratio to a number of conveyed objects in other conveyance routes, etc. First, the characteristics of each conveyance device will be described.

The characteristics of the conveyance vehicle are as follows:

The conveyance efficiency of the conveyance vehicle is lower than that of the conveyor, and the amount that can be conveyed at a time is limited. The conveyance vehicles may need to decelerate or stop to avoid other conveyance vehicles sharing the conveyance route or passengers.

Regarding the conveyance vehicles, flexibility of the conveyance routes is higher than the conveyor. Since the conveyance vehicle itself can move in various directions, it can convey objects to any place where it can travel.

The occupied area of the conveyance vehicle is only the area where the conveyance vehicle exists at that time. Since the conveyance device is normally moving, there is no area where the conveyance vehicle always occupies.

The characteristics of the unidirectional conveyor are as follows.

The conveyance efficiency of the unidirectional conveyor is generally higher than that of the conveyance vehicle.

Regarding the unidirectional conveyor, the flexibility of the conveyance route is lower than that of the conveyance vehicle. The unidirectional conveyor is capable of conveying objects on a predetermined conveyance route, in many cases, only in a predetermined direction. Incidentally, although the conveyance route of the unidirectional conveyor may include branching in a specific direction, since the objects collide with the branching instrument at high speed, it is only available to the conveyance of impact-resistant objects (e.g., an object packed in cardboard, etc.). On the other hand, if the conveyance is made slow in order to reduce the impact, the conveyance capacity will be lowered. Incidentally, since the example embodiments are intended for various types of objects including an impact-non-resistant material such as electronic substrates, it is supposed that the conveyance route by the unidirectional conveyor have no branching. However, the present invention is not necessarily limited to the handling of the objects that are not impact-resistant.

As to the occupied area, the unidirectional conveyor fully occupies the installed area. The conveyance vehicles or the objects cannot move across the area occupied by the unidirectional conveyor.

The new installation cost of the unidirectional conveyor is cheaper than that of the omnidirectional conveyor.

The characteristics of the omnidirectional conveyor are as follows.

The conveyance efficiency of the omnidirectional conveyor is generally higher than that of the conveyance vehicle.

Regarding the omnidirectional conveyor, the flexibility of the conveyance route is lower than that of the conveyance vehicle, but is higher than that of the unidirectional conveyor. The omnidirectional conveyor can change the conveyance direction quickly and flexibly. On the other hand, similarly to the unidirectional conveyor, the omnidirectional conveyor itself cannot move, and therefore it is not possible to convey objects to the place where the omnidirectional conveyor is not installed.

As to the occupied area, the omnidirectional conveyor occupies the installed area. The conveyance vehicle cannot move across the place where the omnidirectional conveyor is installed. However, if the object is moved by placing it on the omnidirectional conveyor, the object itself can move in various directions with respect to the omnidirectional conveyor.

The new installation cost of the omnidirectional conveyor is higher than that of the unidirectional conveyor.

In order to reduce the costs while maintaining the conveyance efficiency, it is effective to replace an expensive conveyor of high conveyance capacity, which is installed in a conveyance route of a low conveyance frequency, with an inexpensive conveyance vehicle (AGV, forklift, bogie, etc.) of low conveyance efficiency. The removed conveyor can be sold as a used item or installed elsewhere. Particularly, the modular-type omnidirectional conveyor is easy to remove and reinstall in other places.

However, if an attempt is made to change the conveyance route (referred to as "the conveyance route A") of the conveyor of low conveyance frequency to the conveyance by the conveyance vehicle, when the conveyance route intersects the conveyance route (referred to as "the conveyance route B") of another conveyor, the conveyance route A is divided by the conveyor of the conveyance route B, and the conveyance vehicle cannot pass through. When the omnidirectional conveyor is installed in the area where the conveyance route A and the conveyance route B intersect, the objects can be transferred if the conveyance vehicles are arranged on both sides of the omnidirectional conveyor even if the conveyance vehicle itself cannot pass through, so that the conveyance of the objects on the conveyance route A itself is possible. However, it is inefficient in terms of cost to install a highly functional and expensive omnidirectional conveyor for the conveyance route A, in which the objects are conveyed only at low frequency. Therefore, in the following example embodiments, the cost is reduced by appropriately replacing the conveyance device according to the situation.

First Example Embodiment

Next, a first example embodiment of the present invention will be described.
(Functional Configuration)

Figure 2:
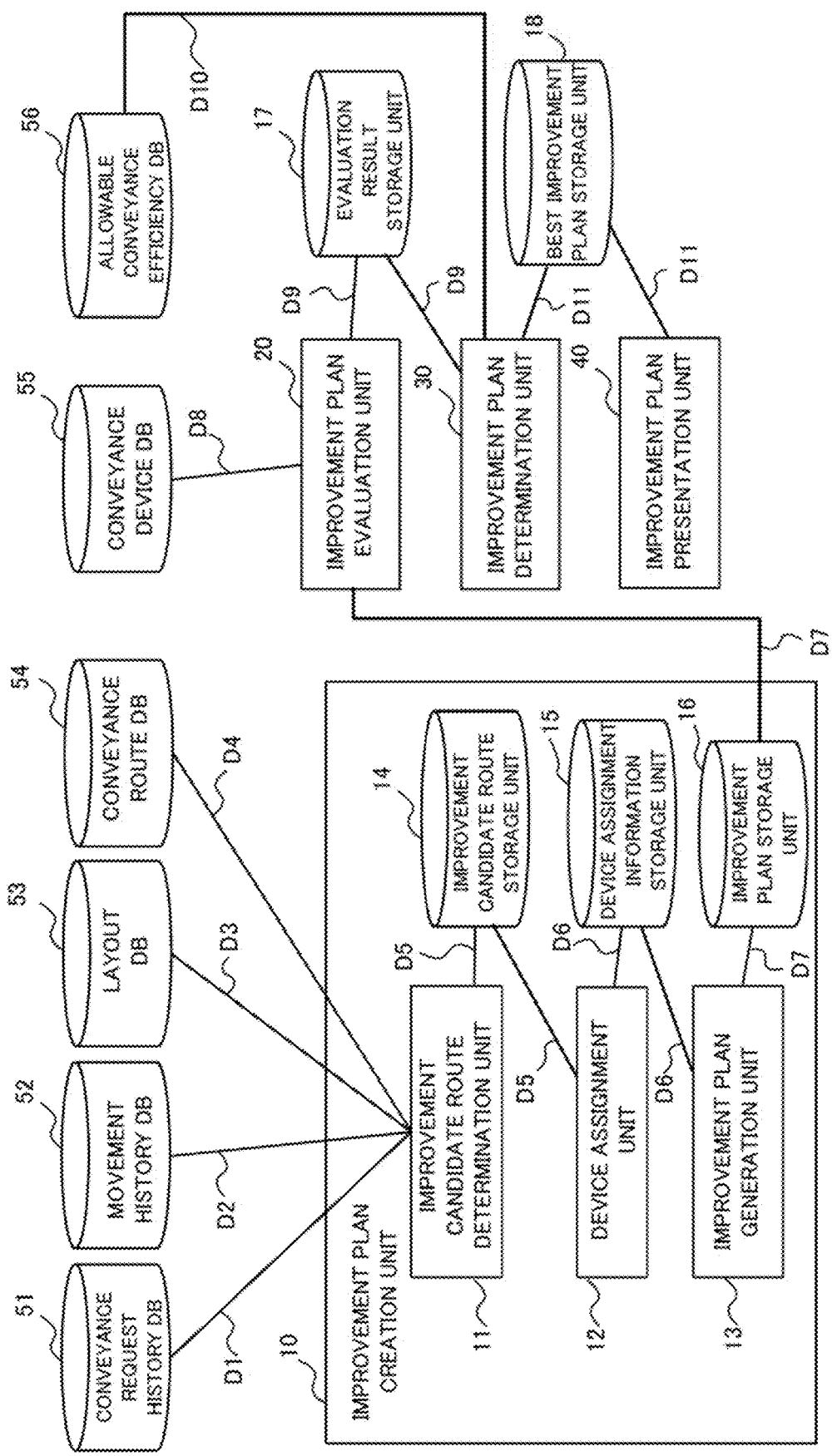
FIG. 2 is a block diagram illustrating a functional configuration of the conveyance route design device according to a first example embodiment.

FIG. 2 illustrates a functional configuration of the conveyance route design device according to the first example embodiment. The conveyance route design device according to this example embodiment roughly includes an improvement plan creation unit 10, an improvement plan evaluation unit 20, an improvement plan determination unit 30, an improvement plan presentation unit 40, an evaluation result storage unit 17, and a best improvement plan storage unit 18. Further, the improvement plan creation unit 10 includes an improvement candidate route determination unit 11, a device assignment unit 12, an improvement plan generation unit 13, an improvement candidate route storage unit 14, a device assignment information storage unit 15, and an improvement plan storage unit 16.

The improvement candidate route determination unit 11 receives, as input information, the conveyance request history information D1 (described later with reference to FIG. 8A) of the objects from a conveyance request history database ("database" will be hereinafter referred to as "DB") 51, receives the movement history information D2 (described later with reference to FIG. 8B) of the objects from a movement history DB 52, receives the layout information D3 (described later with reference to FIG. 4) from a layout DB 53, and receives the conveyance route information D4 (described later with reference to FIG. 6) from a conveyance route DB 54.

The conveyance request history information D1 (described later with reference to FIG. 8A) of the objects includes the request for moving the objects from a conveyance source to a conveyance destination, and the time at which the request occurred, etc.

The movement history information D2 of the objects (described later with reference to FIG. 8B) represents the actual movement history of the objects by the coordinates at a certain time and the conveyance route during stay. The record of the movement history may be transmitted from conveyors or sensors at a fixed cycle, or may be requested by a management server if the management server exists. In addition to recording the movement history at a fixed cycle, the movement history may be recorded when an event occurs, for example, when the object passes through a fixed position.

The layout information D3 (described later with reference to FIG. 4) is information of the position of objects and functions in the factory and the warehouse, and expresses the position of the obstacle O (Obstacle) that the objects cannot pass (the conveyance vehicle cannot pass, or the conveyor cannot be arranged), for example. The shape of an obstacle is expressed by, for example, the vertex coordinates of a polygon indicating the planar shape of the obstacle, the coordinates defining the straight lines or curves forming the contour of the obstacle, the center coordinates and the radius of the circle if the obstacle is circular, and the like. In addition, if an area is defined for each particular function, the obstacle may be expressed by the ID (Identifier) of that area. Examples of the obstacles are the manufacturing device, the device operator's workshop, etc. Also, when the layout is managed by dividing it into a plurality of sub-areas, the obstacle may be expressed by the ID of the sub-area. In that case, the area where the conveyance vehicle can pass may also be expressed by the ID of the sub-area in the same manner. As yet another example, the layout may be divided into sub-areas, and a flag may be used to express the passability of the conveyance vehicle of each sub-area. Also, the conveyance routes through which the conveyance vehicle passes may be expressed by lines (shape information of lines such as coordinates of start points, end points and passing points as well as curvatures of the lines). Further, information about the passable direction such as one-way passage may be added.

The conveyance route information D4 (described later with reference to FIG. 6) represents the conveyance routes in which the objects are conveyed. For example, the conveyance route information D4 represents a conveyance source S (Source), a conveyance destination D (Destination) and passing points of each conveyance route R (Route). Examples of the passing point include a point where the direction changes, a point where an environment-installed type sensor for measuring environmental conditions such as a temperature sensor, a humidity sensor or an illuminance sensor is arranged, a point where a device for reading tags attached to the objects is arranged, arbitrary coordinates, or the like.

Based on these input information, the improvement candidate route determination unit 11 identifies at least a part of the conveyance route, i.e., a point or an area on the conveyance routes, that has a high need for improvement, and determines the improvement candidate routes including it. Specifically, the improvement candidate route determination unit 11 calculates values such as the residence time of the objects, the average value, the intermediate value or the most frequency value of the conveyance time, or the number of times that those values become lower than the threshold, for a plurality of points or areas on the conveyance route. Next, based on the calculated values, the improvement candidate route determination unit 11 calculates the improvement necessity degree for each point or area. The improvement candidate route determination unit 11 calculates the improvement necessity degree by using a formula for calculating the improvement necessity degree from those values, or a table indicating the correspondence between those values and the improvement necessity degree, or the like. The improvement necessity degree becomes higher as the residence time of the objects is shorter, as the average value of the conveyance time is smaller, and as the number of times those values exceeded the allowable value is smaller. The improvement candidate route determination unit 11 determines a part or whole of the conveyance route including a point or an area where the improvement necessity degree is higher than a predetermined value as the improvement candidate route. Then, the improvement candidate route determination unit 11 stores the improvement candidate route information D5 (described later with reference to FIG. 8C) indicating the improvement candidate routes into the improvement candidate route storage unit 14.

The improvement candidate route information D5 represents the conveyance route in which the necessity of improvement is high. The improvement candidate route information D5 includes a start point and an end point of the conveyance route which is the improvement candidate route, an ID of the conveyance route, a numerical value indicating the improvement necessity degree, and the like. The improvement candidate route determination unit 11 may select the improvement candidate route from the entire conveyance routes or from a part of the conveyance routes. The improvement candidate route determination unit 11 may give priority to the conveyance route which is not conveying the important objects as the improvement candidate route. The improvement candidate route determination unit 11 may give priority to the conveyance route in which the conveyor of a specific type (e.g., expensive, old, or low expandability) is used, as the improvement candidate route.

The device assignment unit 12 reads out the improvement candidate route information D5 from the improvement candidate route storage unit 14. Based on the improvement candidate route information D5, the device assignment unit 12 determines the assignment of new conveyance devices to maintain the conveyance efficiency of each improvement candidate route and reduce the cost. The device assignment unit 12 changes the omnidirectional conveyor and the unidirectional conveyor to the conveying vehicle, or changes the omnidirectional conveyor to the unidirectional conveyor. Thus, by the change to less expensive conveyance vehicle, it is possible to reduce the cost.

Specifically, the device assignment unit 12 first calculates the area occupied by the conveyor when the objects are conveyed on the improvement candidate route and on the conveyance route (hereinafter referred to as "non-improvement candidate route") which is not the improvement candidate route and which intersects the improvement candidate route. Next, the device assignment unit 12 calculates an area (hereinafter referred to as "intersection area") where the improvement candidate route and the non-improvement candidate route intersect. Specifically, the intersection area is the area where the non-improvement candidate route intersects the area occupied by the conveyance vehicle if the objects are conveyed by the conveyance vehicle instead of the conveyor in the improvement candidate route.

Next, based on the flow rate ratio of the objects in each conveying direction at the intersection area, the device assignment unit 12 maintains the assignment of the omnidirectional conveyor at least at a part of the intersection area and does not change the assignment. Also, the device assignment unit 12 replaces the omnidirectional conveyor with the unidirectional conveyor at other intersection areas. At this time, since an alternative improvement candidate route that does not pass through the intersection area where the omnidirectional is replaced with the unidirectional conveyor is required, the device assignment unit 12 assigns the conveyance vehicle to the improvement candidate route including a new conveyance route (referred to as a "detour") which has the same start point and endpoint and which bypasses the non-improvement candidate route. If there is no appropriate detour, the device assignment unit 12 cancels the replacement of the omnidirectional conveyor with the unidirectional conveyor at the intersection area, and does not change the assignment. When the omnidirectional conveyor at the intersection area is not replaced, the device assignment unit 12 divides the improvement candidate route into two by the intersection area, and assigns the conveyance vehicle to each of the improvement candidate routes before and after the intersection area. On the other hand, when the improvement candidate route does not include the intersection area, the device assignment unit 12 assigns the conveyance vehicle to the improvement candidate route. The device assignment unit 12 stores the assignment of the conveyance devices into the device assignment information storage unit 15 as the device assignment information D6. The device assignment information D6 (described later with reference to FIG. 13) represents the assignment of the conveyance vehicles to the improvement candidate routes to reduce the cost while maintaining the conveyance efficiency.

The improvement plan generation unit 13 reads out the device assignment information D6 from the device assignment information storage unit 15. The improvement plan generation unit 13 generates, as an improvement plan, a combination of at least a part of the improvement candidate routes to which the conveyance device included in the device assignment information D6 is assigned. If there are three improvement candidate routes, the improvement plan will be the combination that improves one or more of those three improvement candidate routes. The improvement plan generation unit 13 stores the improvement plan information D7 (described later with reference to FIG. 14) indicating the improvement plan into the improvement plan storage unit 16. The improvement plan information D7 represents the combination of presence and absence of the improvement of the improvement candidate routes. The improvement plan may be a combination of all the improvement candidate routes, and may be a combination of the improvement candidate routes of a certain number or less. Also, the improvement plan may be a combination of the improvement candidate routes that satisfy a certain condition (e.g., the number of the improvement candidate routes to be improved is equal to or less than three).

The improvement plan evaluation unit 20 reads out the improvement plan information D7 from the improvement plan storage unit 16, and receives the conveyance device information D8 from the conveyance device DB 55. The conveyance device information D8 (described later with reference to FIG. 15) indicates the conveyance device, its conveyance efficiency and the replacement cost required for newly introduce the conveyance device. The conveyance device is, for example, an omnidirectional conveyor, a unidirectional conveyor or a conveyance vehicle. For each conveyance device, there may be a plurality of types of devices whose processing performance is different from each other. The conveyance efficiency is, for example, an average value, an intermediate value, a maximum value or a most frequent value of a number or quantity of objects that can be conveyed per unit time. As the conveyance efficiency, energy required for conveyance may be considered. For example, a value obtained by dividing or weighting the conveyance efficiency value by the amount of electrical energy required for conveyance may be used. Thus, even when the conveyance efficiency is high, if the required electrical energy is large, the evaluation of the conveyance efficiency is lowered, and it becomes possible to correct the conveyance efficiency from the viewpoint of cost. The replacement cost is, for example, the price of new introduction per unit area, unit length or a number. The replacement cost may include running costs for a certain period of time, such as maintenance costs.

The improvement plan evaluation unit 20 evaluates each improvement plan in accordance with the improvement plan information D7, the conveyance device information D8 and the processing given by the evaluation formula (formula (1) described later) and the cost calculation formula (formula (2) described later) prepared in advance. Specifically, the improvement plan evaluation unit 20 calculates the evaluation index according to the processing given by the evaluation formula, and calculates the required cost according to the processing given by the cost calculation formula. The evaluation index indicates the conveyance efficiency of the whole conveyance system when the conveyance devices are assigned according to the improvement plan, e.g., the throughput of the objects, the lead time of the objects and the compliance rate of the delivery date of the objects. The improvement plan evaluation unit 20 stores the evaluation index and the required cost thus calculated into the evaluation result storage unit 17 as the evaluation result information D9 (described later with reference to FIG. 16). The evaluation result information D9 is the calculation result of the evaluation index and the required cost for each improvement plan.

The improvement plan determination unit 30 reads out the evaluation result information D9 from the evaluation result storage unit 17, and receives the allowable conveyance efficiency information D10 (described later with reference to FIG. 17) from the allowable conveyance efficiency DB 56. The allowable conveyance efficiency information D10 represents the conveyance efficiency allowed by the user. There may be more than one allowable conveyance efficiency for each level of improvement. The improvement plan determination unit 30 selects the improvement plan by which the cost becomes the minimum, from the improvement plans by which the conveyance efficiency is equal to or larger than the allowable conveyance efficiency, based on the evaluation result information D9 and the allowable conveyance efficiency information D10. The improvement plan determination unit 30 stores the selected improvement plan into the best improvement plan storage unit 18 as the best improvement plan D11.

The improvement plan presentation unit 40 reads out the best improvement plan D11 from the best improvement plan storage unit 18, and presents it to the user. The improvement plan presentation unit 40 displays the conveyance route to be improved and the assignment of the conveyance devices by the best improvement plan D11 on the display unit 4. At that time, the improvement plan presentation unit 40 may display the best improvement plan by coloring the part to which a conveyer is newly assigned to reduce the cost differently from other parts. Further, the improvement plan presentation unit 40 may display the best improvement plan by using an AR (Augmented Reality) or VR (Virtual Reality) so that the user can intuitively easily understand. If there is no improvement plan that satisfies the allowable conveyance efficiency, the improvement plan presentation unit 40 may recommend the compromise of the allowable conveyance efficiency with which an improvement plan can be found.

In FIG. 2, the improvement candidate route determination unit 11, the device assignment unit 12 and the improvement plan generation unit 13 of the improvement plan creation unit 10, and the improvement plan evaluation unit 20 and the improvement plan determination unit 30 can be configured by the processor 2 shown in FIG. 1. The improvement plan presentation unit 40 can be configured by the display unit 4. The improvement candidate route storage unit 14, the device assignment information storage unit 15, the improvement plan storage unit 16, the evaluation result storage unit 17 and the best improvement plan storage unit 18 can be configured by the memory 3 shown in FIG. 1. Further, the conveyance request history DB 51, the movement history DB 52, the layout DB 53, the conveyance route DB 54, the conveyance device DB 55 and the allowable conveyance efficiency DB 56 can be configured by the database 5 shown in FIG. 1.

Operation Example

Figure 3:
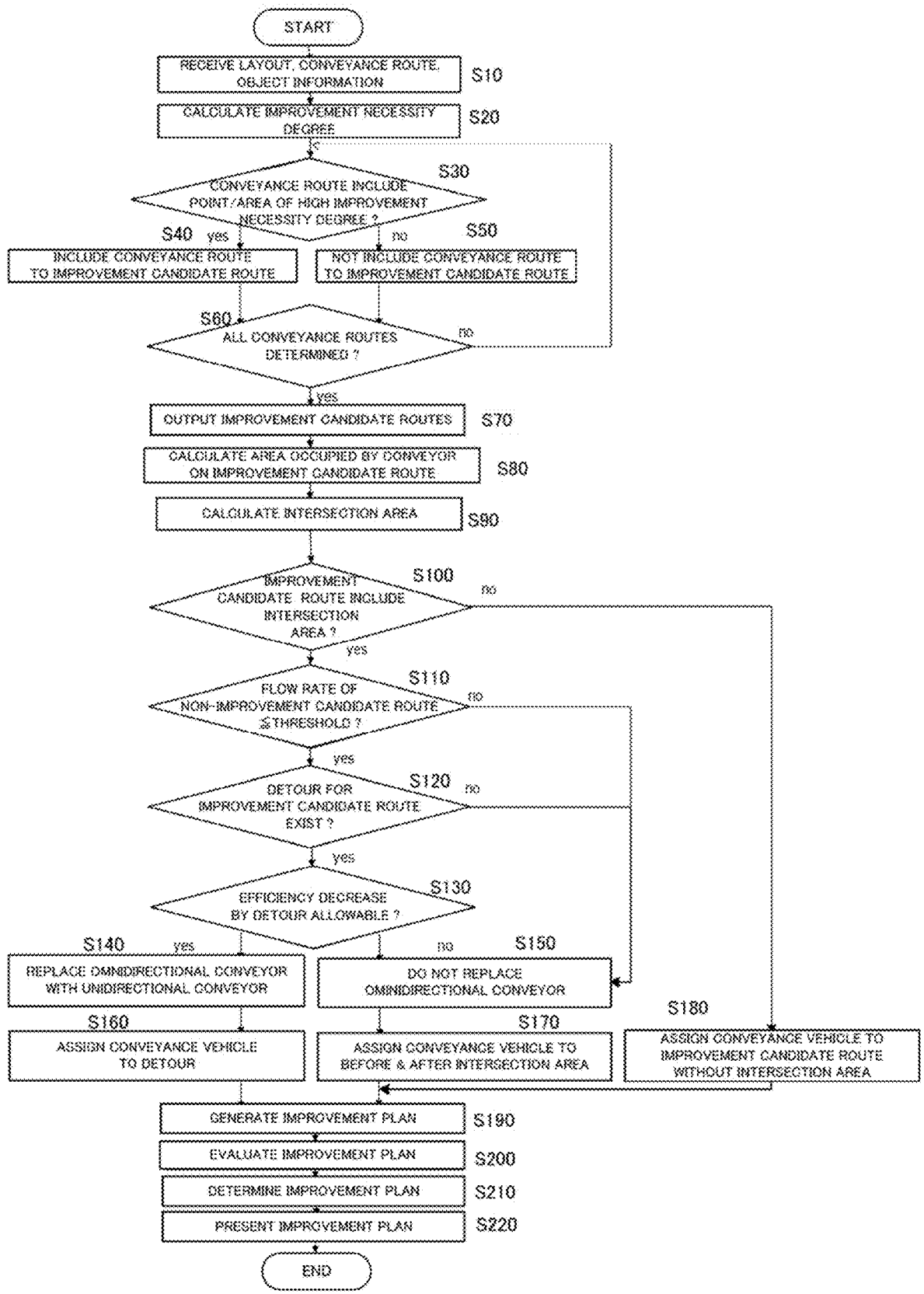
FIG. 3 is a flowchart illustrating an operation example of the conveyance route design device.

Next, an operation example of the conveyance route design device 1 according to the first example embodiment will be described. FIG. 3 is a flowchart of conveyance route improvement processing executed by the conveyance route design device 1. This processing is realized by the processor 2 shown in FIG. 1 which executes a program prepared in advance and stored in the memory 3.

First, the improvement candidate route determination unit 11 of the improvement plan creation unit 10 receives the conveyance request history information D1 of the objects, the movement history information D2 of the objects, the layout information D3 and the conveyance route information D4 (Step S10).

Figures 4, 5:
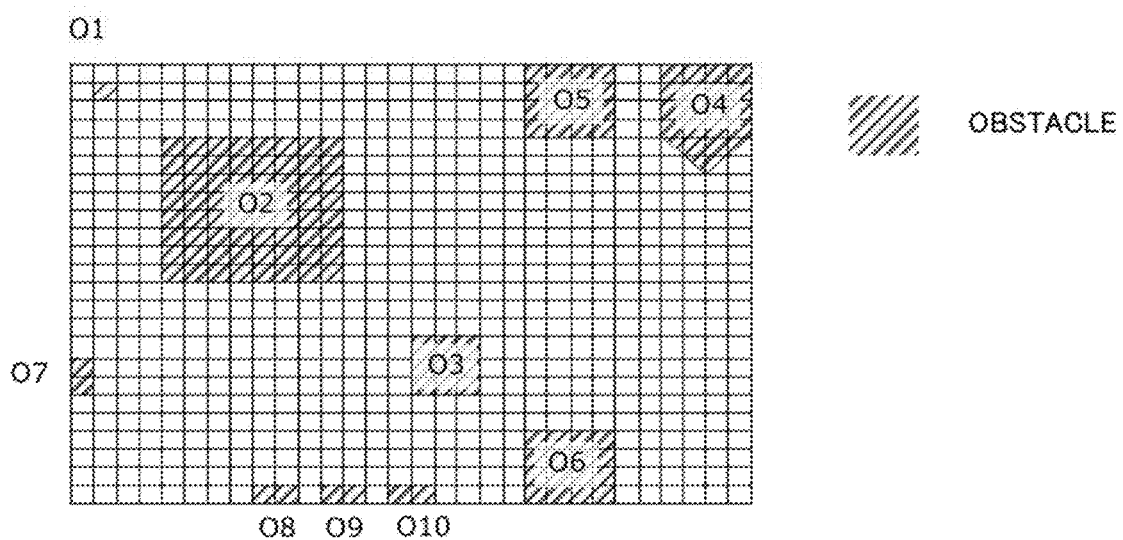
FIG. 4 illustrates an example of layout information.
FIG. 5 is a plan view illustrating a physical arrangement of obstacles indicated by the layout information of FIG. 4.

FIG. 4 illustrates an example of the layout information D3. In the example of FIG. 4, the layout information D3 includes the obstacle ID and the vertex coordinates of the shape of the obstacle. The "obstacle ID" is an identifier assigned to each obstacle. The "vertex coordinates of the shape of obstacles" are coordinates indicating the position of each obstacle. Here, the shape of the impassable obstacle is expressed by the vertex coordinates of the polygon. FIG. 5 illustrates the physical arrangement of obstacles O1 to O10 in the layout information D3 of FIG. 4. Each obstacle is illustrated by an obliquely-lined area.

Figures 6, 7:
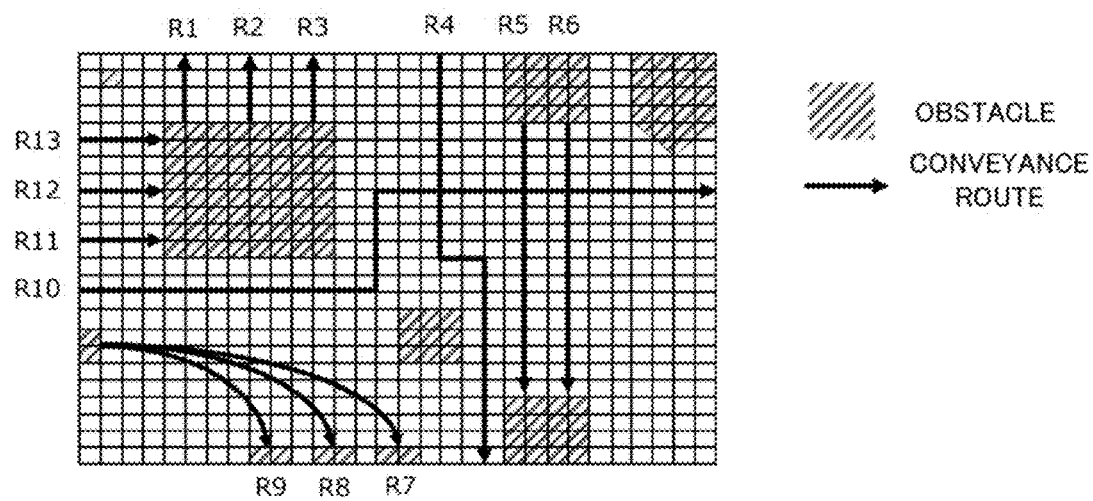
FIG. 6 illustrates an example of conveyance route information.
FIG. 7 is a plan view illustrating a physical arrangement of the conveyance routes indicated by the conveyance route information of FIG. 6.

FIG. 6 shows an example of the conveyance route information D4. In the example of FIG. 6, the conveyance route information D4 includes a conveyance route ID, a conveyance source, a conveyance destination, a passing point and a shape. The "conveyance route ID" is an identifier assigned to each conveyance route. The "conveyance source" indicates the coordinates of the start point of the conveyance route, and the "conveyance destination" indicates the coordinates of the end point of the conveyance route. The coordinates are defined by the x-coordinate in the horizontal direction and the y-coordinate in the vertical direction in the plan view shown in FIG. 5. The "passing point" indicates the coordinates that the conveyance device passes during the movement from the coordinates of the conveyance source to the coordinates of the conveyance destination. The "shape" indicates the shape of the conveyance route viewed in a planar manner. FIG. 7 illustrates the physical arrangement of the conveyance routes R1 to R13 in the conveyance route information D4 of FIG. 6. Each conveyance route is represented by a solid arrow.

FIG. 8A illustrates an example of the conveyance request history information D1 of the objects. In the example of FIG.

8A, the conveyance request history information D1 of the objects includes a conveyance request ID, a conveyance source, a conveyance destination, a request occurrence time, an object ID, a deadline and a conveyance device ID. The "conveyance request ID" is an identifier assigned to each conveyance request. The "conveyance source" indicates the coordinates of the point where the object exists, and the "conveyance destination" indicates the coordinates of the destination of the object. The "request occurrence time" is the time when the conveyance request occurred. The "object ID" is the identifier of the object to be conveyed. The "deadline" indicates the time when the object conveyance should be completed. The "conveyance device ID" is the identifier of the conveyance device used for the conveyance of the object. Incidentally, the conveyance device ID is defined by the conveyance device information D8 which will be described later with reference to FIG. 15.

FIG. 8B shows an example of the movement history information D2 of the object. In the example of FIG. 8B, the movement history information D2 of the object includes a movement history ID, current coordinates, a conveyance route ID during stay, time, a conveyance request ID and a conveyance device ID. The "movement history ID" is an identifier assigned to each movement history information. The "current coordinates" are the position coordinates of the object when its movement history information is generated. The "conveyance route ID during stay" is the conveyance route ID of the conveyance route to which the position of the object belongs. The "time" is the time when the movement history information is generated. The "conveyance request ID" is the ID of the conveyance request on which the movement history of the object is based. The "conveyance device ID" is the ID of the conveyance device conveying the object.

After step S10 in FIG. 3, the improvement candidate route determination unit 11 calculates the improvement necessity degree for each point or area using the average value, the intermediate value, the most frequent value of the residence time or the conveyance amount of the objects, the number or the ratio of times that those values become lower than the most frequent value, or a formula of adding them together with weights, based on the conveyance request history information D1 of the objects, the movement history information D2 of the objects, the layout information D3 and the conveyance route information D4 (Step S20). Here, the point may be coordinates, for example. The area is represented by, for example, a set of a start point and an end point of a straight line or curve, or vertex coordinates of a polygon. The points and areas may be at least a part of the conveyance route. Also, if the areas are divided for each specific function, the area may be the unit thus divided. Further, when the layout is managed by dividing the layout into sub-areas, the improvement necessity degree may be calculated for each sub-area.

Next, the improvement candidate route determination unit 11 determines a point or an area where the improvement necessity degree is high. For example, when the improvement necessity degree is higher than a predetermined threshold value, the improvement candidate route determination unit 11 determines that the improvement necessity degree at that point or area is high. The threshold value may be a value set by the user, or may be a value which is a constant value or a constant ratio higher than the average value, the most frequent value or the intermediate value of the improvement necessity degree of the surrounding areas. Hereinafter, a point or area is collectively referred to as a "place," and a point or area whose improvement necessity degree is high is referred to as an "improvement target place."

For example, the improvement target place is identified as follows. First, the improvement candidate route determination unit 11 extracts the places where the actual conveyance capacity is excessive for the conveyance request. The criterion for determining that the conveyance capacity is excessive for the conveyance request is, for example, that the residence time of the objects is short just before entering the place. Also, when the place where the conveyance capacity is excessive is the conveyance route itself, the criterion is that the residence time of the objects waiting to be conveyed from the conveyance source is short. Specifically, when the average, the most frequent value or the intermediate value of the residence time is equal to or smaller than a certain threshold value, the improvement candidate route determination unit 11 determines that the residence time is short. At this time, the improvement candidate route determination unit 11 may consider the residence time within a certain time window. Further, the improvement candidate route determination unit 11 may determine that the residence time is short, when the time in which the CDF (Cumulative Distribution Function) of the residence time becomes equal to or larger than a constant value is equal to or shorter than a constant threshold value. The residence time can be calculated, for example, from the difference between the time when the conveyance request of the object arrives, which is obtained from the conveyance request history information D1, and the time when the conveyance of the object actually begins, which is obtained from the movement history information D2 of the objects.

Next, at the extracted place, the improvement candidate route determination unit 11 determines whether or not the average value, the most frequent value, the intermediate value or the maximum value of the conveyance amount of the objects currently being carried by the conveyor is equal to or smaller than the threshold value that does not cause the congestion or congestion if the objects are carried by the conveyance vehicle instead of the conveyor. This threshold is, for example, a conveyance amount that can be carried when plural conveyance vehicles are arranged to convey the objects in an area including the extracted place or its periphery at intervals of a braking distance (i.e., a distance that the conveyance vehicle cannot approach other conveyance vehicle in view of safety). Incidentally, the improvement candidate route determination unit 11 may calculate the threshold value in consideration of the road width, the curve, the inclination, or the interference with the surrounding obstacles of the improvement target place. Also, a skilled layout designer may enter this threshold.

When the conveyance amount of the objects at the extracted place is classified as being equal to or less than the threshold value, the improvement candidate route determination unit 11 determines the place as the improvement target place. Otherwise, the improvement candidate route determination unit 11 does not determine the place as the improvement target place. In this way, it is possible to extract only the place, where no congestion or congestion occurs when the objects are carried by the conveyance vehicle instead of the conveyor, as the improvement target place.

Next, the improvement candidate route determination unit 11 determines whether or not each conveyance route includes the point or the area having a high improvement necessity degree, i.e., the improvement target place thus extracted (Step S30). When the conveyance route includes the improvement target place (Step S30: yes), the improvement candidate route determination unit 11 includes at least a part of the conveyance route in the improvement candidate routes (Step S40). At this time, the improvement candidate route determination unit 11 may include the whole part of the conveyance route in the improvement candidate routes, and may include only a part including the point or the area having a high improvement necessity degree in the improvement candidate routes. On the other hand, when the conveyance route does not include the improvement target place (Step S30: no), the improvement candidate route determination unit 11 does not include the conveyance route in the improvement candidate routes (Step S50).

Next, the improvement candidate route determination unit 11 determines whether or not the above-described determination has been completed for all the conveyance routes (Step S60). When the determination for all the conveyance routes has not been completed yet (Step S60: no), the improvement candidate route determination unit 11 returns to Step S30 and determines the next conveyance route. On the other hand, when the determination has been completed for all the conveyance routes to be determined (Step S60: yes), the improvement candidate route determination unit 11 proceeds to the next step S70. Incidentally, the conveyance routes to be determined may be all the conveyance routes, or specific conveyance routes may be excluded. Also, the conveyance routes to be determined may be the conveyance routes of a specific number, length or area. Further, the user may input the conveyance route to be included in the determination target, or the conveyance route to be excluded from the determination target.

Figure 9:
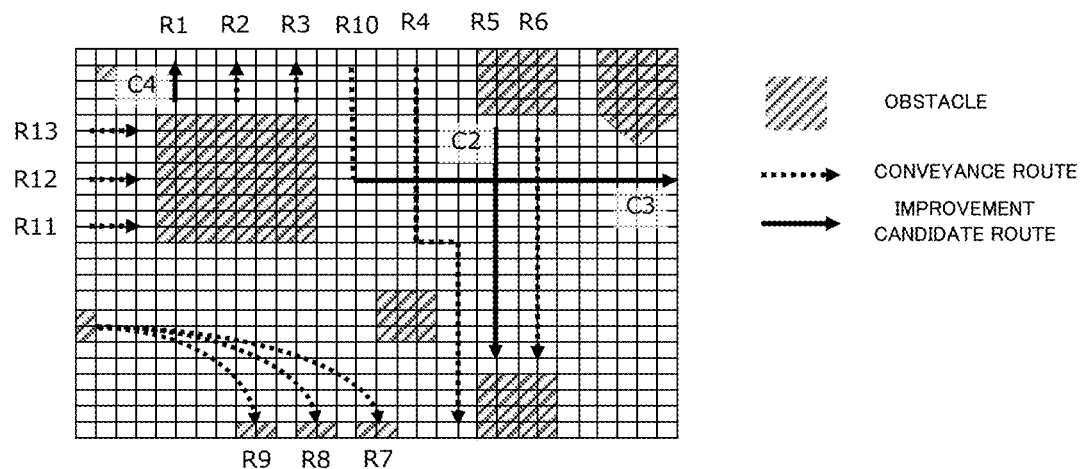
FIG. 9 is a plan view illustrating a physical arrangement of improvement candidate routes.

Next, the improvement candidate route determination unit 11 outputs the obtained improvement candidate routes to the improvement candidate route storage unit 14 (Step S70). FIG. 8C illustrates an example of the outputted improvement candidate route information. Also, FIG. 9 illustrates the physical arrangement of the improvement candidate routes shown in FIG. 8C. In FIG. 9, the conveyance route is indicated by a dotted line arrow, and the improvement candidate route is indicated by a solid line arrow. In this example, three improvement candidate routes C2-C4 are outputted. In this example, the improvement candidate route C2 represents the entire conveyance route R5, and the improvement candidate route C4 represents the entire conveyance route R1. On the other hand, the improvement candidate route C3 represents a part of the conveyance route R10. In this way, even among the same conveyance routes, there are cases where only a part of the conveyance route becomes the improvement candidate route.

Next, the device assignment unit 12 reads out the improvement candidate route information from the improvement candidate route storage unit 14, and calculates the area (footprint) occupied by the conveyor on the improvement candidate route and on the non-improvement candidate route intersecting the improvement candidate route (Step S80). The area occupied by the conveyor may be an area including a certain margin in consideration of errors.

Figure 10:
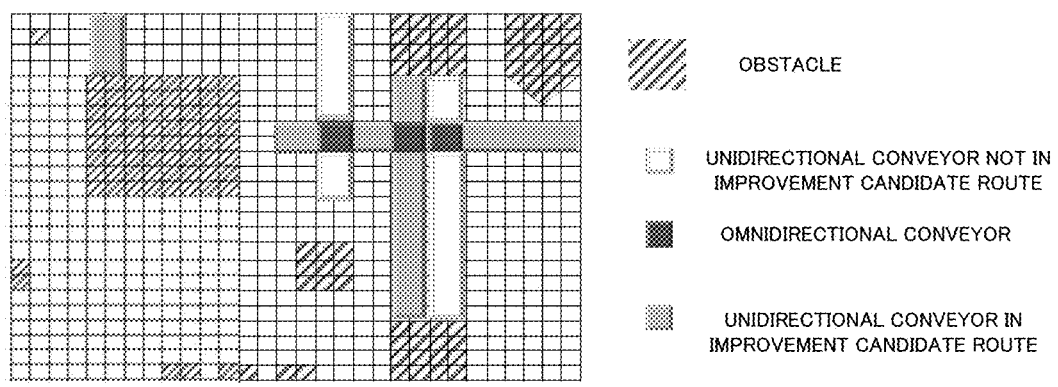
FIG. 10 is a plan view illustrating areas occupied by conveyors on the improvement candidate routes and the conveyance routes.

FIG. 10 illustrates an example of the physical arrangement of the areas occupied by the conveyors when the improvement candidate routes shown in FIG. 9 are given. The area occupied by the unidirectional conveyor on the improvement candidate route is shown as gray, the omnidirectional conveyor is shown as black, and the area occupied by the unidirectional conveyor on the non-improvement candidate route intersecting the improvement candidate route is shown as white.

Next, the device assignment unit 12 calculates the intersection area, i.e., an area where the improvement candidate route and the non-improvement candidate route intersect (Step S90). FIG. 11 illustrates an example of the physical arrangement of the intersection area when the physical arrangement of the areas occupied by the conveyors shown in FIG. 10 is given. In the example of FIG. 11, the area occupied by the conveyance vehicle on the improvement candidate route is shown by the gray pentagon, and the area where the conveyance vehicle on the improvement candidate route overlaps the non-improvement candidate route is shown by the black pentagon. In the example of FIG. 11, as the intersection area, there are two areas where the black omnidirectional conveyor and the black pentagon overlap. The intersection area may be an area that is strictly overlapped, or may be an area including a certain margin in consideration of errors. It is noted that, in FIG. 11, there is one area where two black pentagons overlap, as the area where the improvement candidate routes intersect. However, since the conveyance vehicle is assigned to both of the conveyance routes in this area, it is not included in the intersection areas.

Next, the device assignment unit 12 determines whether or not each improvement candidate route includes the intersection area (Step S100). When the improvement candidate route includes the intersection area (Step S100: yes), the process proceeds to step S110. On the other hand, when each improvement candidate route does not include the intersection area (Step S100: no), the process proceeds to step S180.

In step S110, the device assignment unit 12 determines whether or not the flow rate of the non-improvement candidate route is equal to or smaller than the threshold value in the intersection area (step S110). If the flow rate of the non-improvement candidate route is equal to or smaller than the threshold value (step S110: yes), the process proceeds to step S120. On the other hand, if the flow rate of the non-improvement candidate route is not equal to or smaller than the threshold value (step S110: no), the process proceeds to step S150.

Next, the device assignment unit 12 determines, for the improvement candidate route, whether or not there is a detour which has the same start point and end point and which does not pass through the intersection area and other conveyors (step S120). The device assignment unit 12 generates a shortest path considering obstacles as a detour. Namely, the device assignment unit 12 generates a detour which avoids the obstacles and which reaches from the start point to the endpoint at the shortest. If there is such a detour (step S120: yes), the process proceeds to step S130. If there is no detour (step S120: no), the process proceeds to step S150.

Next, the device assignment unit 12 determines whether or not the decrease in the conveyance efficiency when the detour is used is within the allowable range (step S130). Specifically, the device assignment unit 12 determines whether or not the requirement of the conveyance time cannot be satisfied, or whether or not the deterioration of the conveyance time becomes equal to or larger than a constant value. As a specific example, the device assignment unit 12 determines whether or not the length of the detour is within twice the original conveyance route (or, 1.5 times, 1.7 times, 2.3 times, etc.). In another example, the device assignment unit 12 may consider the number of curves which lowers the conveyance speed, or the number of intrusion into the area where exclusive control causing congestion is required. If the decrease of the conveyance efficiency when the detour is used is within the allowable range (step S130: yes), the process proceeds to step S140. If the decrease of the conveyance efficiency is not within the allowable range (step S130: no), the process proceeds to step S150.

In step S140, the device assignment unit 12 replaces the omnidirectional conveyor of the non-improvement candidate route in the intersection area with the unidirectional conveyor. Then, in step S160, the device assignment unit 12 assigns the conveyance vehicle to the detour. In this case, in the non-improvement candidate route, the omnidirectional conveyor is changed to the unidirectional conveyor, but the flow rate is maintained. On the other hand, the improvement candidate route is changed to the detour and the conveyance vehicle is assigned, thereby reducing the cost. Thus, when the conveyance capacity in one conveyance direction is excessive in the intersection area and there is an appropriate detour, removing the omnidirectional conveyor can reduce the cost while maintaining the conveyance efficiency.

On the other hand, in step S150, the device assignment unit 12 leaves the omnidirectional conveyor of the non-improvement candidate route in the intersection area as it is. Then, in step S170, the device assignment unit 12 divides the improvement candidate route into the front and rear parts of the intersection area, and assigns the conveyance vehicle to the respective parts. In this case, since the parts before and after the intersection area of the improvement candidate route are changed to the conveyance vehicles, the cost can be reduced. It should be noted that the objects of the improvement candidate route cross the non-improvement candidate route by the omnidirectional conveyor in the intersection area. Further, in step S180, the device assignment unit 12 assigns the conveyance vehicle to the improvement candidate route that does not include the intersection area. In this case, since the conveyor is changed to the conveyance vehicle in the whole part of the improvement candidate route that does not include the intersection area, the cost can be reduced.

Thus, it becomes possible to reduce the cost by reducing the number of costly omnidirectional conveyors while maintaining the conveyance efficiency. FIG. 12 illustrates the result of the assignment of the conveyance devices in the example of FIG. 11. In FIG. 12, the gray pentagons represent the areas occupied by the conveyance vehicles assigned to the improvement candidate route which was originally the conveyor. This improvement candidate route includes a newly generated detour (the assignment IDs: A7,A8,A9 of FIG. 13). This detour is formed to bypass the part where the unidirectional conveyor is arranged by replacing the omnidirectional conveyor with the unidirectional conveyor in the intersection area. FIG. 13 illustrates the device assignment information in the case of FIG. 12. The "assignment ID" is an identifier assigned to each assignment of the conveyance device. The "improvement candidate route ID" indicates the ID of the improvement candidate route corresponding to the assignment ID. The "start point" and "endpoint" are the coordinates of the start point and the endpoint of the range to which the conveyance device is assigned. The "type of conveyor" indicates the type of conveyance device to be assigned to each area of the improvement candidate route.

As described above, when the improvement candidate route includes the intersection area, the device assignment unit 12 arranges the unidirectional conveyor in the non-improvement candidate route and assigns the conveyance vehicle to the detour for at least a part of the improvement candidate route including the intersection area (step S160), or assigns the conveyance vehicles to the parts before and after the improvement candidate route divided by the intersection area (step S170). Also, when the improvement candidate route does not include the intersection area, the device assignment unit 12 assigns the conveyance vehicle to the improvement candidate route (step S180). In this way, the device assignment unit 12 can reduce the cost while maintaining the conveyance efficiency.

Next, the improvement plan generation unit 13 generates, as the improvement plan, combinations of the improvement candidate routes to which the conveyance devices are assigned (Step S190). The improvement plan may be generated for some combinations or all combinations. When the improvement plan is generated for all the combinations, the number of the combinations is 2^(number of improvement candidate routes) (where "^" represents a power). The improvement plan may be generated until the combination reaches a predetermined number. Also, specific combinations may be excluded. For example, a particular area or the conveyance route of a particular conveyance vehicle may be excluded. As an example, the conveyance vehicle is not introduced and the conveyor is maintained in a certain area, because there is an authenticated line of a customer company and the conveyor should not be changed in that area. As another example, one of the three conveyance vehicles of introduction candidates having lowest expandability may be excluded. FIG. 14 shows the improvement plan information when all combinations are listed as the improvement plans based on FIG. 13. In the improvement plan information, the "improvement plan ID" is the identifier assigned to each improvement plan. FIG. 14 shows the improvement plan information when there are three improvement candidate routes C2-C4. In FIG. 14, for comparison, the combination in which all the improvement candidate routes C2 to C4 are not improved is shown as the "improvement plan I1 (present)".

Next, the improvement plan evaluation unit 20 calculates the evaluation index and the required cost for each improvement plan in accordance with the improvement plan information D7 generated by the improvement plan generation unit 13, the conveyance device information D8, and the processing indicated by the evaluation formula and the cost calculation formula prepared in advance, and evaluates the improvement plan (Step S200). FIG. 15 illustrates an example of the conveyance device information. The "conveyance device ID" is an identifier assigned to each conveyance device. The "description" indicates the contents of each conveyance device. The "average conveyance efficiency" indicates the average conveyance efficiency of each conveyance device, and the "replacement cost" indicates the replacement cost of each conveyance vehicle. This example represents the average conveyance efficiency (e.g., the average value of the number of objects that can be conveyed per unit time) and the replacement cost (e.g., the cost per unit length when a conveyance vehicle is replaced with a conveyor), for the three types of conveyance vehicles including the omnidirectional conveyor, the unidirectional conveyor and the conveyance vehicle. FIG. 16 illustrates examples of the calculated required cost and the evaluation result of the evaluation index calculated according to the processing expressed by the evaluation formula. In the evaluation result information of FIG. 16, the "improvement plan ID" is an identifier of the improvement plan to be evaluated. The "required cost" is the cost required by each improvement plan, and is obtained by the processing expressed by the cost calculation formula (2) described later. The "evaluation index" indicates the value of the evaluation index of each improvement plan calculated according to the processing expressed by the cost calculation formula (1) described later.

Evaluation of each improvement plan can be made using common technologies. The evaluation indices to be evaluated according to the processing expressed by the evaluation formula are, for example, throughput of objects as a whole of factory and warehouse, and compliance rate of delivery date of objects. The simplest example of the evaluation formula for calculating the evaluation index for each improvement plan is the following formula (1). The improvement plan evaluation unit 20 calculates the following evaluation index when the conveyance devices are assigned according to each improvement plan.

(Evaluation index)=(Average conveyance efficiency of conveyance vehicle)×(Number of conveyance vehicle)+(Average conveyance efficiency of unidirectional conveyor)×Quantity of unidirectional conveyor)+(Average conveyance efficiency of omnidirectional conveyor)×(Quantity of omnidirectional conveyor)   (1)

In a factory or a warehouse, layout of the factory or the warehouse, interference between conveyance vehicles and surrounding environments, interference between conveyance vehicles, arrival rate of conveyance requests, arrival patterns of conveyance requests, characteristics of conveyance vehicles (maximum speed, maximum acceleration, cruise speed, reliability, etc.), and priority control methods of conveyance tasks are often considered in order to more accurately evaluate the evaluation indices of conveyance efficiency. As other examples of the evaluation technique which can consider these elements, the following general methods can be utilized: Agent-based simulation which regards a conveyance vehicle as an agent, analysis of transition probability of the conveyance state by Stochastic Petri Net and Stochastic Time Petri Net, and fluid simulation which regards (approximates) the objects as a fluid.

Since many computational resources are generally required for these analyses and simulations, if we comprehensively evaluate the combination plan of assigning the conveyor to each area of all possible conveyance routes without using the improvement plan creation unit 10, a large number of computational resources will be required. In this example embodiment, since the improvement plan creation unit 10 can drastically reduce the number of the improvement plans to be evaluated, it is possible to reduce the memory required for the calculation. Also, since the computation amount and required memory are reduced, larger and more complex layouts can be evaluated with the same computational resources.

Further, the required cost of each improvement plan is calculated according to the processing expressed by the following cost calculation formula (2), for example.

(Required cost)=$\Sigma\_i$ (replacement cost of conveyance vehicle $i$ included in the improvement plan)×(Quantity of the conveyance vehicle $i$ included in the improvement plan)   (2)

(Note: $\Sigma\_i$ represents processing of calculating the sum for i.)

As a method of calculation, the evaluation index and the required cost of all improvement plans may be calculated first. As another method, in order to efficiently find the plan capable of satisfying a constant conveyance efficiency and minimizing the cost, only the required cost requiring small calculation amount may be calculated first, and then the calculation may be stopped when the conveyance efficiency reaches the threshold. Instead, the calculation may be terminated when the calculation time exceeds the threshold value.

Figures 17, 18:
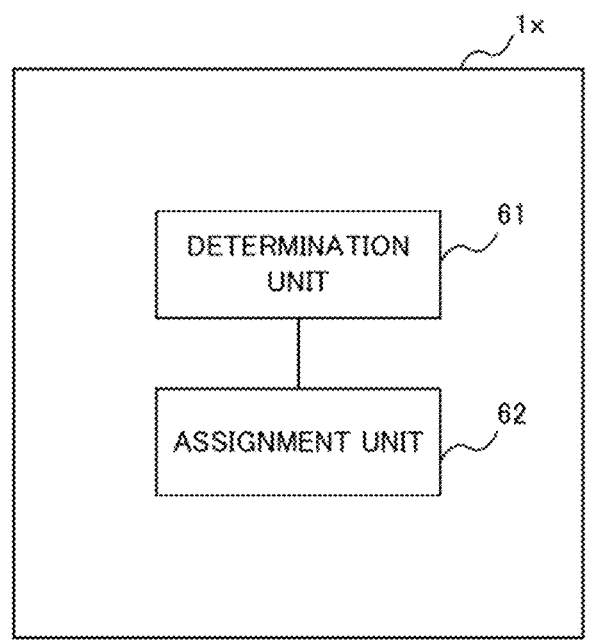
FIG. 17 illustrates an example of allowable conveyance efficiency information.
FIG. 18 is a block diagram illustrating a functional configuration of a conveyance route design device according to a second example embodiment.

Next, the improvement plan determination unit 30 selects the improvement plan having the optimum evaluation result satisfying the conveyance efficiency constraint based on the required cost and the evaluation index of the evaluation result information, and determines it as the best improvement plan (Step S210). FIG. 17 illustrates an example of allowable conveyance efficiency information. The "improvement design plan" is an identifier assigned to each improvement design plan. The "allowable conveyance efficiency" is the allowable conveyance efficiency of each improvement design plan. In the example of FIG. 17, three different improvement design plans and their allowable conveyance efficiencies are stored. The improvement plan determination unit 30 selects the improvement plan having the lowest cost within the allowable conveyance efficiency. In the case of the improvement design plan P1 of FIG. 17, the improvement plan I15 in FIG. 16 is selected. Similarly, in the case of the improvement design plan P2, the improvement plan I6 in FIG. 16 is selected. In the case of the improvement design plan P3, the improvement plan I3 in FIG. 16 is selected. Next, the improvement plan presentation unit 40 displays the selected best improvement plan to the user by displaying it on the display unit 4 (Step S220).

In the above example, the improvement plan presentation unit 40 displays only the best improvement plan on the display unit 4. Instead, the improvement plan presentation unit 40 may display a plurality of improvement plans. For example, the improvement plan presentation unit 40 may display a predetermined number of improvement plans from the upper level of the evaluation result at the same time.

As described above, in the present example embodiment, the conveyance route design device determines at least a part of the conveyance route including the improvement target place as an improvement candidate route, based on at least one of the information relating to the conveyance route and the information relating to the conveyance of the objects. Then, the conveyance route design device generates the device assignment information to assign the conveyance devices to the improvement candidate route, and generates a combination of at least a part of the improvement candidate routes to which the conveyance device is assigned, as an improvement plan. This makes it possible to reduce the cost while maintaining the conveyance efficiency, in a conveyance system including plural kinds of conveyance devices having different conveyance characteristics and including the omnidirectional conveyor.

For example, it is supposed that a conveyor that is easy to change the layout is used, as described in the International Application WO2018/038171. Also, it is supposed that the conveyance route design device 1 makes an improvement plan using the conveyor as a conveyance device. In this case, when the device assignment unit 12 determines to assign the conveyor to a certain place, the device assignment unit 12 may control the conveyor to move to the certain place and then execute the conveyance process at the certain place. In this case, the conveyor moves to the certain place in response to the control, and then executes the conveyance process at the certain place.

Second Example Embodiment

Figure 19:
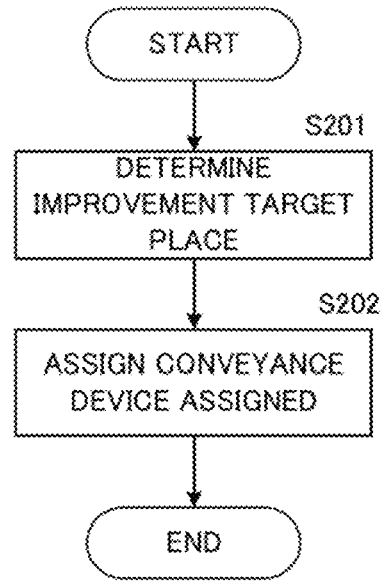
FIG. 19 is a flowchart of processing by the conveyance route design device according to the second example embodiment.

Next, a second example embodiment of the present invention will be described. FIG. 18 is a block diagram illustrating a functional configuration of the conveyance route design device 1x according to the second example embodiment. Also, FIG. 19 is a flowchart of processing by the conveyance route design device 1x according to the second example embodiment. As shown in FIG. 18, the conveyance route design device 1x includes a determination unit 61 and an assignment unit 62. For a conveyance system including a plurality of conveyance routes, the route design device 1*x* determines the improvement target place that satisfies the criteria for changing to a conveyance device of a lower conveyance capacity than a current conveyance device (step S201). An example of the improvement target place is a place where the actual conveyance capacity is excessive with respect to the conveyance request amount, and it is determined by the residence time of the objects at that place or the like. The determination unit 61 can be implemented using a function similar to that of the improvement candidate route determination unit 11 illustrated in FIG. 2.

Next, the assignment unit 62 assigns a conveyance device of a lower conveyance capacity than the current conveyance device to the improvement candidate route that is a conveyance route including the improvement target place (step S202). Specifically, when the current conveyance device is the unidirectional conveyor or the omnidirectional conveyor, the assignment unit 62 assigns the conveyance vehicle instead. The assignment unit 62 can be implemented using the same functions as the function of the device assignment unit 12 shown in FIG. 2. Thus, in the second example embodiment, the cost can be reduced by assigning the conveyance device, which has low conveyance capacity but is inexpensive, to the conveyance route including the place where the conveyance capacity is excessive.

In each example embodiment described above, the processing of the conveyance route design device has been described by referring to an example in which the two conveyance routes intersect. However, three or more conveyance routes may intersect. Also, while the conveyance routes intersect orthogonally in the examples shown in FIGS. 10 and 11, it is not necessary that the conveyance routes intersect orthogonally. Namely, the conveyance route and the manner in which a plurality of conveyance routes intersect are not limited to the examples described above.

A part or all of the example embodiments described above may also be described as the following supplementary notes, but not limited thereto.

(Supplementary Note 1)

A conveyance route design device comprising:
- a determination unit configured to determine an improvement target place that satisfies criteria for changing a current conveyance device to a conveyance device of lower conveyance capacity than the current conveyance vehicle, for a plurality of conveyance routes; and
- an assignment unit configured to assign the conveyance device of lower conveyance capacity to an improvement candidate route which is the conveyance route including the improvement target place.

(Supplementary Note 2)

The conveyance route design device according to supplementary note 1, wherein the assignment unit determines assignment of the conveyance device to an intersection area where the improvement candidate route intersects, based on whether or not the improvement candidate route intersects.

(Supplementary Note 3)

The conveyance route design device according to supplementary note 1,
- wherein the determination unit determines at least a part of the conveyance route including the improvement target place as the improvement candidate route based on at least one of information relating to the conveyance route and information relating to conveyance of objects,
- wherein the assignment unit generates device assignment information for assigning an omnidirectional conveyor or a unidirectional conveyor to the intersection area, and assigning a conveyance vehicle to the improvement candidate route, and
- wherein the conveyance route design device further comprises an improvement plan generation unit configured to generate a combination of at least a part of the improvement candidate routes to which the conveyance device is assigned, as an improvement plan, based on the device assignment information.

(Supplementary Note 4)

The conveyance route design device according to supplementary note 3, further comprising:
- an improvement plan evaluation unit configured to evaluate each improvement plan based on conveyance device information and outputs an evaluation result;
- an improvement plan determination unit configured to determine the improvement plan giving a best evaluation result as a best improvement plan, based on the evaluation result and allowable conveyance efficiency information; and
- a presentation unit configured to present the best improvement plan.

(Supplementary Note 5)

The conveyance route design device according to supplementary note 4,
- wherein the improvement plan evaluation unit calculates an evaluation index relating to the conveyance efficiency and a required cost as the evaluation result, for each improvement plan, and
- wherein the improvement plan determination unit determines, based on the evaluation result, the improvement plan in which the conveyance efficiency is equal to or higher than the allowable conveyance efficiency and the required cost is minimum as the best improvement plan.

(Supplementary Note 6)

The conveyance route design device according to supplementary note 1, wherein the determination unit determines the improvement target place based on at least one of an average value of a residence time of objects, an average value, an intermediate value and a most frequent value of a conveyance amount of the objects, a number or a ratio of times that the residence time or the conveyance amount becomes lower than a threshold value, and a weighted sum thereof.

(Supplementary Note 7)

The conveyance route design device according to supplementary note 1, wherein the determination unit determines a certain position as the improvement target place when the residence time of the objects immediately before the certain position on the conveyance route is equal to or smaller than a predetermined threshold value and the conveyance amount at the certain position is lower than a predetermined threshold value.

(Supplementary Note 8)

The conveyance route design device according to supplementary note 2, wherein the assignment unit determines an intersection area where an area occupied by the conveyance vehicle on the improvement candidate route and an area occupied by the conveyor on a non-improvement candidate route intersecting the improvement candidate route intersect, as the intersection area.

(Supplementary Note 9)

The conveyance route design device according to supplementary note 2, wherein the assignment unit determines to replace the omnidirectional conveyor with the unidirectional conveyor at least in a part of the intersection area based on a ratio of a flow rate of the objects in each conveyance direction in the intersection area.

(Supplementary Note 10)

The conveyance route design device according to supplementary note 2, wherein the assignment unit determines to assign the conveyance vehicle to the improvement candidate route that does not include the intersection area.

(Supplementary Note 11)

The conveyance route design device according to supplementary note 2, wherein the assignment unit determines to replace the omnidirectional conveyor in the intersection area with the unidirectional conveyor when the improvement candidate route includes the intersection area, a flow rate ratio in the conveyance direction of the improvement candidate route in the intersection area is equal to or smaller than a threshold value, there is a detour that bypasses the intersection area, and deterioration of the conveyance efficiency of the detour is within an allowable range.

(Supplementary Note 12)

The conveyance route design device according to supplementary note 11, wherein, when the assignment unit replaces the omnidirectional conveyor in the intersection area with the unidirectional conveyor, the assignment unit assigns the conveyance vehicle to a detour with the same start and end points and not passing through the intersection area and other conveyors.

(Supplementary Note 13)

The conveyance route design device according to supplementary note 9, wherein, when the omnidirectional conveyor in the intersection area is not replaced, the assignment unit divides the improvement candidate route at the intersection area and determines to assign the conveyance vehicle to the improvement candidate route before and after the intersection area.

(Supplementary Note 14)

The conveyance route design device according to supplementary note 9, wherein the flow rate is any one of a throughput per unit time of the objects, an absolute amount of the objects, a shipment amount relative to an incoming amount, a ratio to an amount of the objects carried by another conveyance route including the improvement candidate route forming the intersection area, and an average value, a most frequency value or an intermediate value thereof.

(Supplementary Note 15)

The conveyance route design device according to supplementary note 3,
wherein the information relating to the conveyance route includes layout information indicating a position of an obstacle, and conveyance route information indicating the route by which the objects are to be conveyed, and
wherein the information relating to conveyance of the objects includes conveyance request history information indicating a history of a conveyance request of the objects, and movement history information indicating an actual movement history of the objects.

(Supplementary Note 16)

A conveyance route design method executed by a computer, the method comprising:
determining an improvement target place that satisfies criteria for changing a current conveyance device to a conveyance device of lower conveyance capacity than the current conveyance device, for a plurality of conveyance routes; and
assigning the conveyance device of lower conveyance capacity to an improvement candidate route which is a conveyance route including the improvement target place.

(Supplementary Note 17)

A recording medium recording a conveyance route design program that causes a computer to function as:
a determination function of determining an improvement target place that satisfies criteria for changing a current conveyance device to a conveyance device of lower conveyance capacity than the current conveyance device, for a plurality of conveyance routes; and
an assignment function of assigning the conveyance device of lower conveyance capacity to an improvement candidate route which is a conveyance route including the improvement target place.

While the invention has been described with reference to example embodiments and examples thereof, the invention is not limited to these example embodiments and examples. It will be understood by those of ordinary skill in the art that various changes in form and details may be made within the scope of the present invention.

DESCRIPTION OF SYMBOLS

1 Conveyance route design device
2 Processor
3 Memory
4 Display unit
5 Database
10 Improvement plan creation unit
11 Improvement candidate route determination unit
12 Device assignment unit
13 Improvement plan generation unit
20 Improvement plan evaluation unit
30 Improvement plan determination unit
40 Improvement plan presentation unit

What is claimed is:

1. A conveyance route design device comprising:
a processor; and
a memory storing instructions executable by the processor to:
determine an improvement target place that satisfies criteria for reassigning the improvement target place from a omnidirectional conveyor to a conveyance vehicle having a lower conveyance capacity;
determine an area of intersection of an improvement candidate route including the improvement target place and a non-improvement candidate route that does not include the improvement target place, the improvement target place initially assigned to the omnidirectional conveyor in the improvement candidate route, the non-improvement candidate route assigned to a unidirectional conveyor;
generate an improvement plan including the improvement candidate route, such that based on a flow rate of the non-improvement candidate route, whether the improvement candidate route includes a detour, and whether an efficiency decrease resulting from using the detour is allowable:
the omnidirectional conveyor is replaced with the unidirectional conveyor for the area of intersection in the improvement plan, the detour is used in the improvement plan, and the conveyance vehicle is assigned to the detour in the improvement plan, or
the omnidirectional conveyor is not replaced with the unidirectional conveyor for the area of intersection in the improvement plan, and the conveyance vehicle is assigned to the improvement candidate route before and after the area of intersection in the improvement plan; and cause conveyance of objects according to the generated improvement plan.

2. The conveyance route design device according to claim 1, wherein the processor determines the improvement target place based on at least one of an average value of a residence time of objects; an average value, an intermediate value; and a most frequent value of a conveyance amount of the objects, a number or a ratio of times that the residence time or the conveyance amount becomes lower than a threshold value; and a weighted sum thereof.

3. The conveyance route design device according to claim 2, wherein the processor determines a position as the improvement target place when the residence time of the objects at the position is equal to or smaller than a predetermined threshold value and the conveyance amount at the position is lower than a predetermined threshold value.

4. The conveyance route design device according to claim 1, wherein the processor determines the area of intersection where an area occupied by the conveyance vehicle on the improvement candidate route and an area occupied by the unidirectional conveyor on the non-improvement candidate route intersecting the improvement candidate route intersect.

5. The conveyance route design device according to claim 1, wherein the processor determines to replace the omnidirectional conveyor with the unidirectional conveyor at least in a part of the area of intersection based on a ratio of a flow rate of objects in the area of intersection.

6. The conveyance route design device according to claim 1, wherein the processor determines to assign the conveyance vehicle to the improvement candidate route that does not include the area of intersection.

7. The conveyance route design device according to claim 1, wherein the processor determines to replace the omnidirectional conveyor in the area of intersection with the unidirectional conveyor when the improvement candidate route includes the area of intersection, a flow rate ratio in the area of intersection is equal to or smaller than a threshold value, the detour is present and bypasses the area of intersection, and deterioration of conveyance efficiency of the detour is within an allowable range.

8. The conveyance route design device according to claim 7, wherein, when the processor replaces the omnidirectional conveyor in the area of intersection with the unidirectional conveyor, the processor assigns the conveyance vehicle to the detour with same start and end points.

9. The conveyance route design device according to claim 5, wherein, when the omnidirectional conveyor in the area of intersection is not replaced, the processor divides the improvement candidate route at the area of intersection and determines to assign the conveyance vehicle to the improvement candidate route before and after the area of intersection.

10. The conveyance route design device according to claim 5, wherein the flow rate is any one of a throughput per unit time of the objects, an absolute amount of the objects, a shipment amount relative to an incoming amount, a ratio to an amount of the objects carried by another conveyance route including the improvement candidate route forming the area of intersection, and an average value, a most frequency value or an intermediate value thereof.

11. A conveyance route design method executed by a computer and comprising:

determining an improvement target place that satisfies criteria for reassigning the improvement target place from a omnidirectional conveyor to a conveyance vehicle having a lower conveyance capacity;

determining an area of intersection of an improvement candidate route including the improvement target place and a non-improvement candidate route that does not include the improvement target place, the improvement target place initially assigned to the omnidirectional conveyor in the improvement candidate route, the non-improvement candidate route assigned to a unidirectional conveyor;

generating an improvement plan including the improvement candidate route, such that based on a flow rate of the non-improvement candidate route, whether the improvement candidate route includes a detour, and whether an efficiency decrease resulting from using the detour is allowable:

the omnidirectional conveyor is replaced with the unidirectional conveyor for the area of intersection in the improvement plan, the detour is used in the improvement plan, and the conveyance vehicle is assigned to the detour in the improvement plan, or the omnidirectional conveyor is not replaced with the unidirectional conveyor for the area of intersection in the improvement plan, and the conveyance vehicle is assigned to the improvement candidate route before and after the area of intersection in the improvement plan; and causing conveyance of objects according to the generated improvement plan.

12. A non-transitory computer-readable recording medium storing a conveyance route design program that causes a computer to perform:

determining an improvement target place that satisfies criteria for reassigning the improvement target place from a omnidirectional conveyor to a conveyance vehicle having a lower conveyance capacity;

determining an area of intersection of an improvement candidate route including the improvement target place and a non-improvement candidate route that does not include the improvement target place, the improvement target place initially assigned to the omnidirectional conveyor in the improvement candidate route, the non-improvement candidate route assigned to a unidirectional conveyor;

generating an improvement plan including the improvement candidate route, such that based on a flow rate of the non-improvement candidate route, whether the improvement candidate route includes a detour, and whether an efficiency decrease resulting from using the detour is allowable:

the omnidirectional conveyor is replaced with the unidirectional conveyor for the area of intersection in the improvement plan, the detour is used in the improvement plan, and the conveyance vehicle is assigned to the detour in the improvement plan, or the omnidirectional conveyor is not replaced with the unidirectional conveyor for the area of intersection in the improvement plan, and the conveyance vehicle is assigned to the improvement candidate route before and after the area of intersection in the improvement plan; and causing conveyance of objects according to the generated improvement plan.

* * * * *